(12) United States Patent
Fenton et al.

(10) Patent No.: US 10,216,222 B2
(45) Date of Patent: Feb. 26, 2019

(54) PORTABLE ELECTRONIC DEVICE CASE

(71) Applicant: Fairhaven Group, Inc., Seattle, WA (US)

(72) Inventors: Timothy John Fenton, Mercer Island, WA (US); Gary Allen Ashley, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 15/647,521

(22) Filed: Jul. 12, 2017

(65) Prior Publication Data

US 2019/0018451 A1   Jan. 17, 2019

(51) Int. Cl.
  *G06F 1/16*   (2006.01)
  *A45F 5/00*   (2006.01)
  *G06F 1/00*   (2006.01)

(52) U.S. Cl.
  CPC .............. *G06F 1/1616* (2013.01); *A45F 5/00* (2013.01); *G06F 1/1613* (2013.01); *G06F 1/00* (2013.01); *G06F 2200/1633* (2013.01)

(58) Field of Classification Search
  CPC ............................................. G06F 2200/1633
  See application file for complete search history.

(56) References Cited

U.S. PATENT DOCUMENTS

| | | | | |
|---|---|---|---|---|
| 4,106,597 A * | 8/1978 | Shook | ..................... | A45C 11/20 190/110 |
| 5,835,344 A * | 11/1998 | Alexander | ............ | G06F 1/1628 361/679.46 |
| 6,896,134 B2 * | 5/2005 | Russell | ..................... | A45C 3/02 206/320 |
| 7,643,274 B2 * | 1/2010 | Bekele | .................. | G06F 1/1616 206/320 |
| 7,886,903 B1 * | 2/2011 | Wurzelbacher, Jr. | ....................... | G06F 1/1616 206/320 |
| 7,907,400 B2 * | 3/2011 | Bekele | .................. | G06F 1/1616 206/320 |
| 9,247,796 B1 * | 2/2016 | Mulhern | ................. | A45C 11/00 |
| 2006/0226040 A1 * | 10/2006 | Medina | ................. | G06F 1/1616 206/320 |
| 2009/0205985 A1 * | 8/2009 | Freeman | .................. | A45C 3/02 206/320 |
| 2013/0092562 A1 * | 4/2013 | Wyner | ................... | A45C 11/00 206/45.23 |
| 2014/0061084 A1 * | 3/2014 | Westrup | ................. | A45C 13/02 206/472 |
| 2018/0110306 A1 * | 4/2018 | Armstrong | ............. | A45C 11/00 |

* cited by examiner

*Primary Examiner* — Anthony Q Edwards
(74) *Attorney, Agent, or Firm* — Grandview Law

(57) ABSTRACT

Systems and methods are involved with but are not limited to: a keyboard case portion including a first base portion and one or more first flaps so positioned with one or more first gaps between the first base portion and the one or more first flaps. In addition to the foregoing, other aspects are described in the claims, drawings, and text forming a part of the present disclosure.

11 Claims, 10 Drawing Sheets

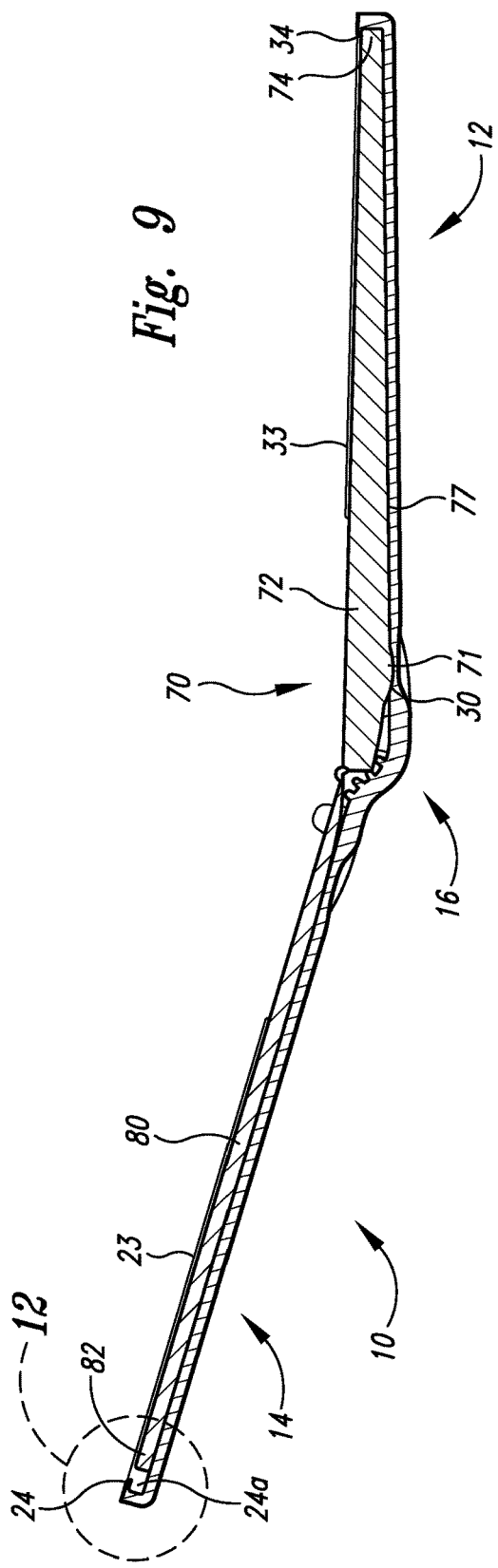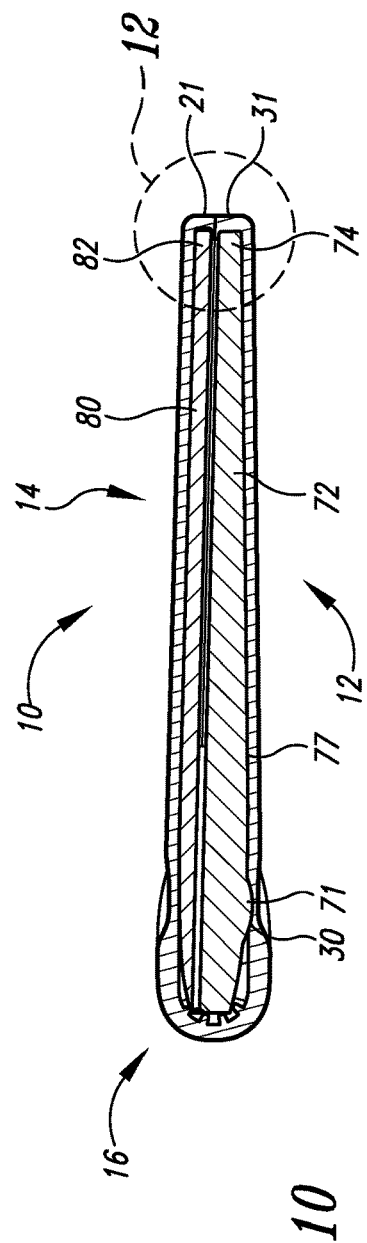

PORTABLE ELECTRONIC DEVICE CASE

SUMMARY

In one aspect, an apparatus includes, but is not limited to a keyboard case portion including a first base portion and one or more first flaps so positioned with one or more first gaps between the first base portion and the one or more first flaps; and a display case portion hingedly coupled to the keyboard case portion, the display case portion including a second base portion and one or more second flaps so positioned with one or more second gaps between the second base portion and the one or more second flaps. Other aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of disparate material outsole based articles of manufacture, compositions of matter, systems for producing and/or methods for producing same that may provide context, for instance, in introducing one or more processes and/or devices described herein.

FIG. 9 is a cross-sectional view of the conformable laptop case in a near-flat-open disposition shown engaging both the display portion and the keyboard portion of an exemplary laptop case.

FIG. 10 is a cross-sectional view of the conformable laptop case in the closed disposition shown engaging both the display portion and the keyboard portion of an exemplary laptop case.

DETAILED DESCRIPTION

Figure 1:
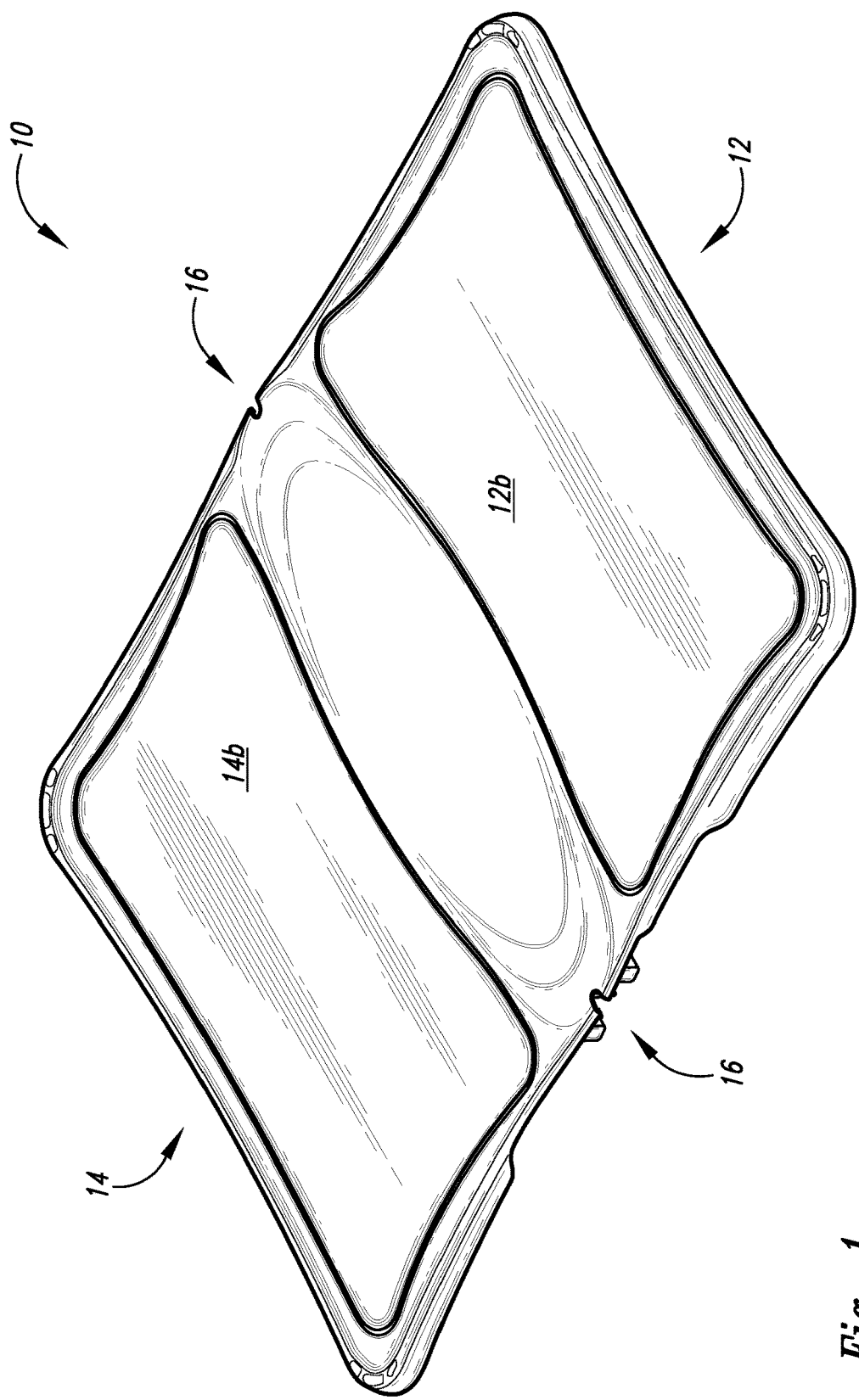
FIG. 1 is an exterior perspective view of a conformable laptop case in a flat-open disposition without containing an exemplary laptop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Conventional cases for portable electronic devices such as laptops can use straps and other securing means that can cause obstructions and be visually and tactilely displeasing. Conventional cases also may not stay secured to laptops when in both closed and open positions.

Figure 2:
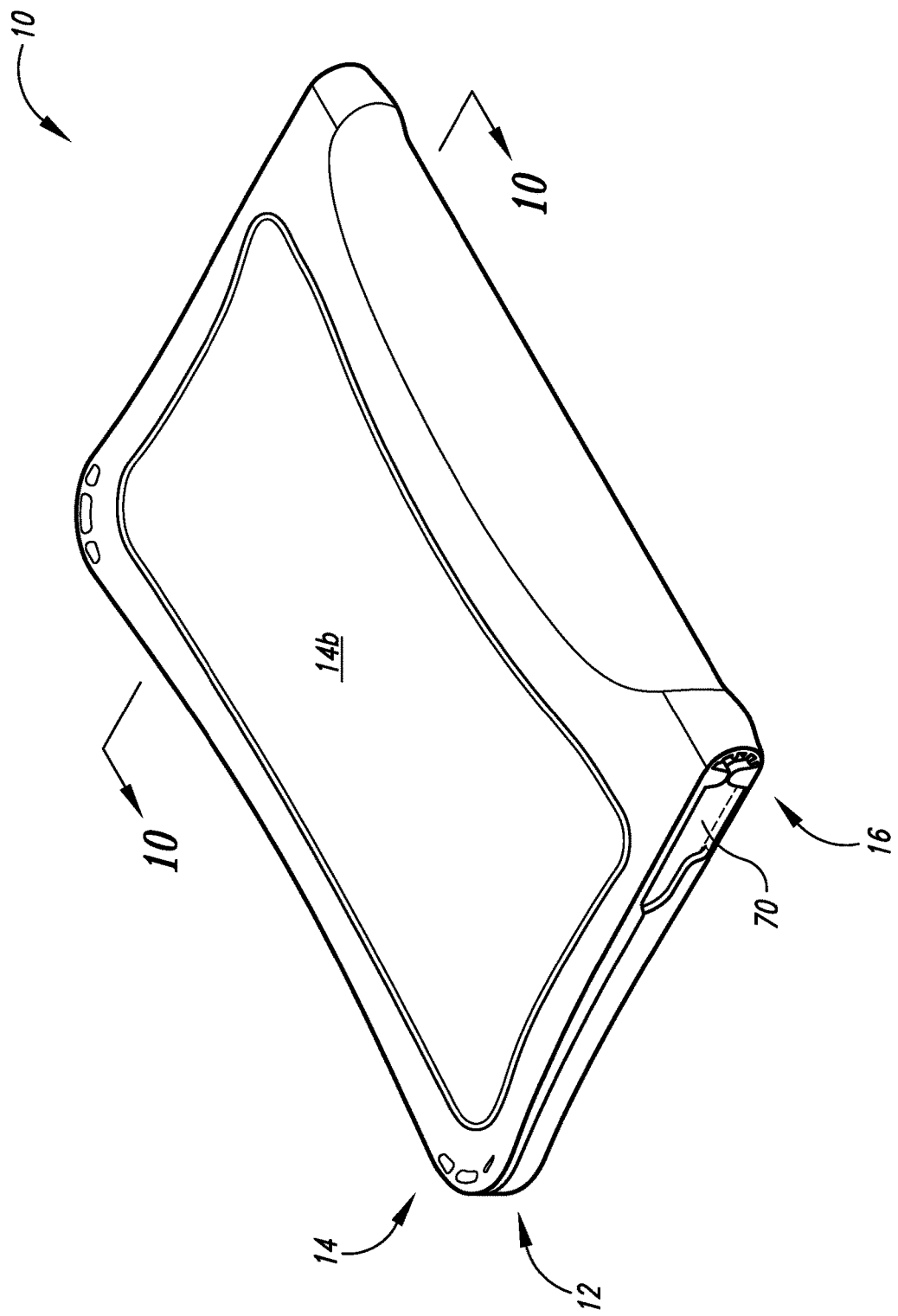
FIG. 2 is an exterior perspective view of the conformable laptop case in a closed disposition containing an exemplary laptop.

Referring now to FIG. 1, a first embodiment of portable device case 10 is depicted from an exterior perspective view in a flat-open disposition and as having keyboard case portion 12 and display case portion 14 with a flexible hinge-like portion 16 positioned there betwixt to allow for axially oriented motion of keyboard case portion 12 and display case portion 14 relative therebetween. Portable device case 10 is depicted in FIG. 2 from an exterior perspective view in a closed disposition with exemplary laptop 70 being contained therein. The first embodiment of portable device case 10 is depicted in FIGS. 1 and 2 as having panel 12b of keyboard case portion 12 and panel 14b of display case portion 14. In the first embodiment, panel 12b and panel 14b can be made from translucent, semi-transparent, or transparent reinforced thermal plastic urethane whereas other portions of portable device case 10 can be made from semi-opaque or opaque materials. Other embodiments of portable device case 10 may not include panel 12b or panel 14b as translucent, semi-transparent, or transparent, but rather keyboard case portion 12 and display case portion 14 can be made from semi-opaque or opaque material throughout.

Figure 3:
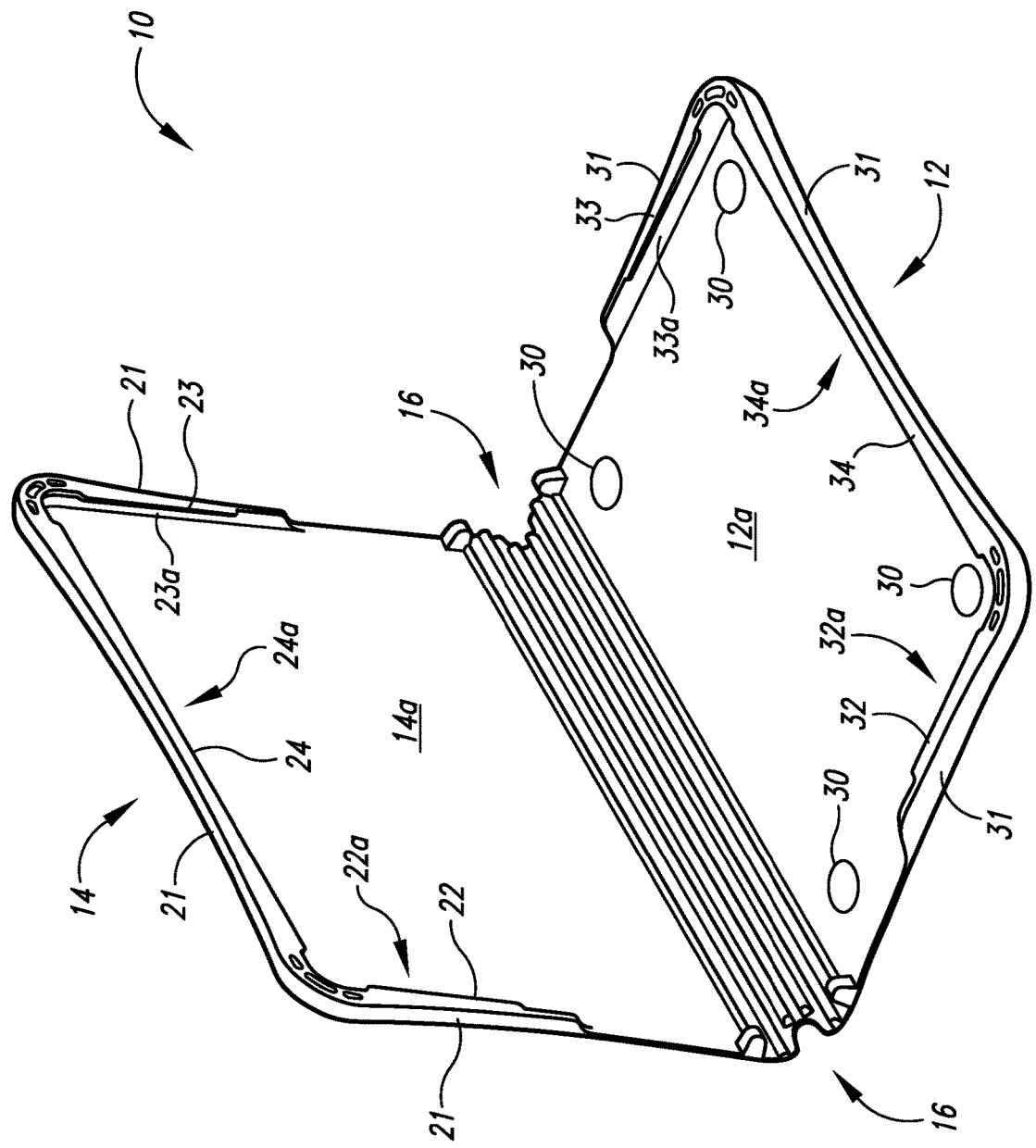
FIG. 3 is an interior perspective view of the conformable laptop case in an angled-open disposition.

Referring now to FIG. 3, portable device case 10 is depicted from an interior perspective view in an angled-open position wherein the keyboard case portion 12 includes substantially planar base portion 12a with indents 30 (shown having circular form) to receive complementarily shaped feet 71 of keyboard bottom 77 of exemplary laptop 70 (shown in FIG. 4) of the portable device case 10. Returning to FIG. 3, along portions of the periphery of base portion 12*a* is guard wall 31 perpendicularly extending from base portion 12*a* with left flap 32, right flap 33, and center flap 34 perpendicularly extending from guard wall 31 and extending parallel over base portion 12*a* thereby forming gaps 32*a*, 33*a*, and 34*a*, respectively, to receive portable device case 10. Portable device case 10 is further depicted in FIG. 3 wherein display case portion 14 includes substantially planar base portion 14*a*; having along portions of its periphery, guard wall 21 perpendicularly extending from base portion 14*a* with left flap 22, right flap 23, and center flap 24 (e.g. made of semi-rigid material, such as thermoplastic material) perpendicularly extending from guard wall 21 and extending parallel over base portion 12*a* thereby forming gaps 22*a*, 23*a*, and 24*a*, respectively, to receive portable device case 10.

Figure 4:
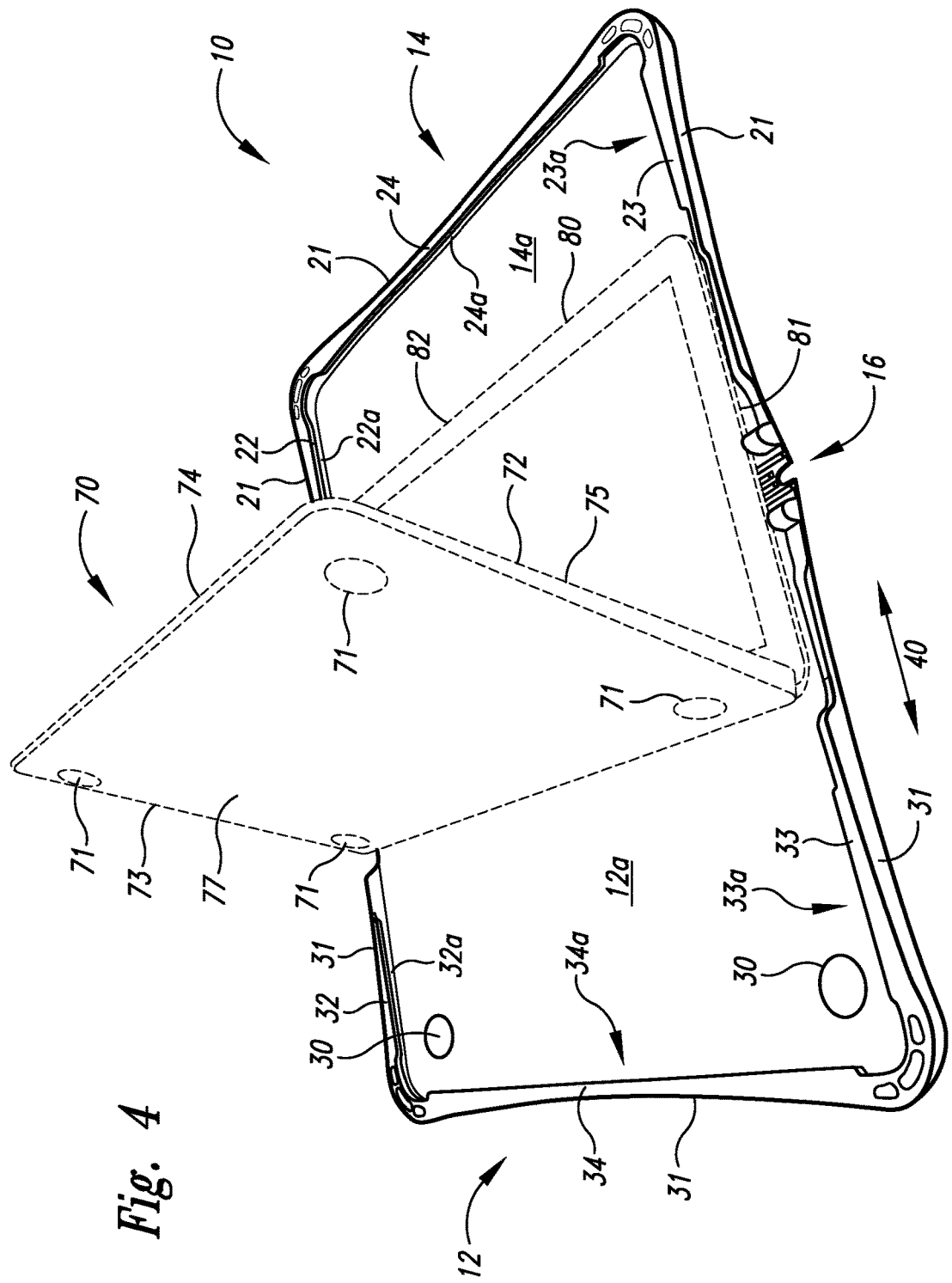
FIG. 4 is an interior perspective view of the conformable laptop case in the flat-open disposition shown receiving display portion of an exemplary laptop case.

Referring now to FIG. 4, the portable device case 10 is depicted with an interior perspective view in the flat-open position shown beginning to receive exemplary laptop 70 along direction 40. As shown, exemplary laptop 70 further includes keyboard assembly 72 including keyboard left portion 73, keyboard front portion 74, keyboard right portion 75. Exemplary laptop 70 further includes display assembly 80 including display right portion 81, display front portion 82, and display left portion 85 (shown in FIG. 5). Exemplary laptop 70 is shown in FIG. 4 being slid with display assembly 80 in contact with base portion 14*a* along direction 40 toward center flap 24 so that display right portion 81, display front portion 82, and display left portion 85 will enter into gaps 23*a*, 24*a*, and 22*a*, respectively, to slidably engage with right flap 23, center flap 24, and left flap 22, respectively (slidable engagement shown in FIG. 5), and base portion 14*a*.

Figure 5:
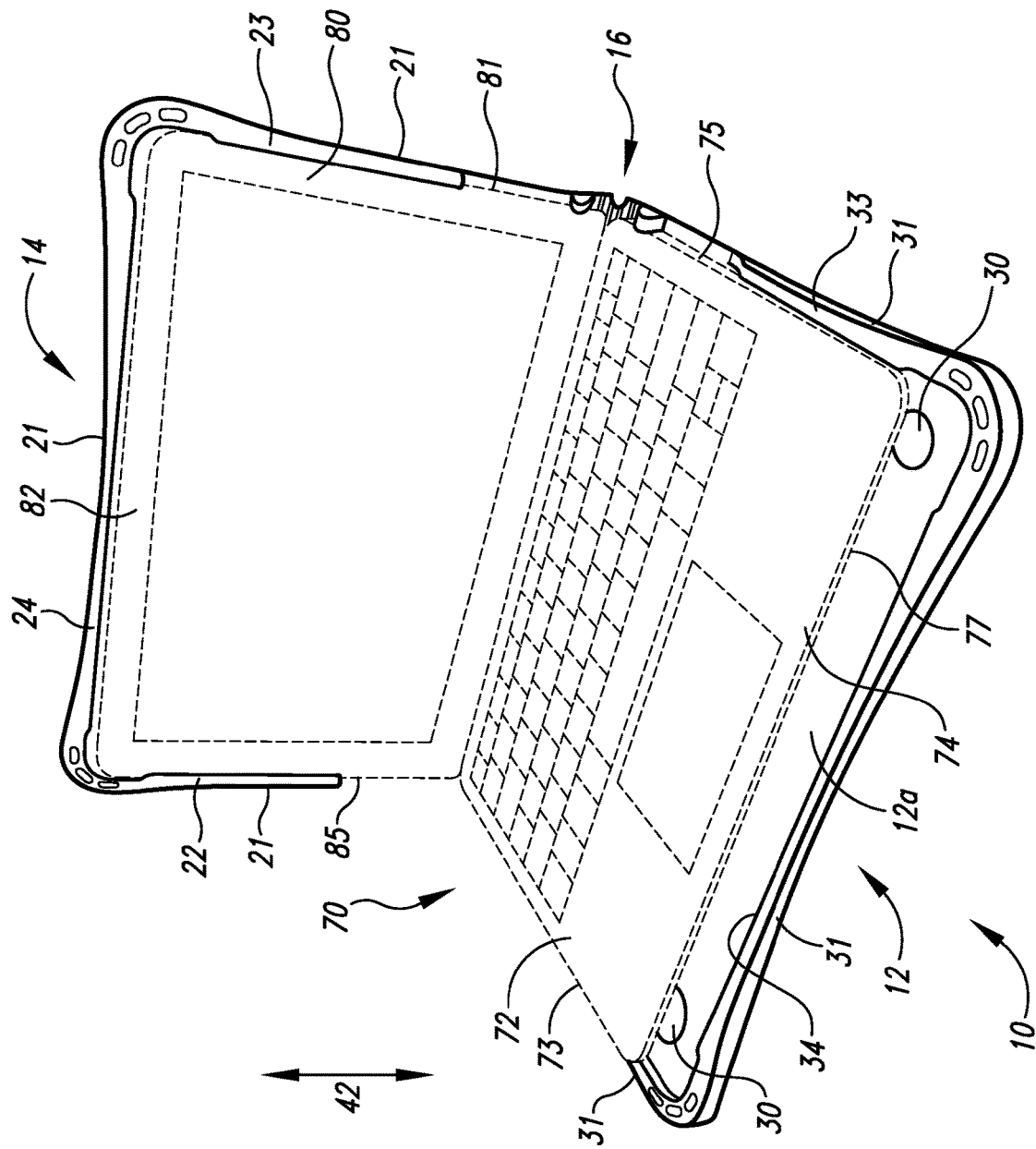
FIG. 5 is an interior perspective view of the conformable laptop case in an angled-open disposition shown receiving the keyboard portion of an exemplary laptop case.

Referring now to FIG. 5, with display assembly 80 slidably engaged with display case portion 14, keyboard assembly 72 is position with keyboard bottom 77 in contact with left flap 32 (not shown), and right flap 33. With sufficient force on keyboard assembly 72, keyboard left portion 73 and keyboard right portion 75 will cause left flap 32 (not shown) and right flap 33, respectively, to flex so that keyboard left portion 73 and keyboard right portion 75 will then be positioned in gaps 32*a* and 33*a*, thereby slidably engaging with left flap 32 and right flap 33, respectively, along with base portion 12*a*.

Figure 6:
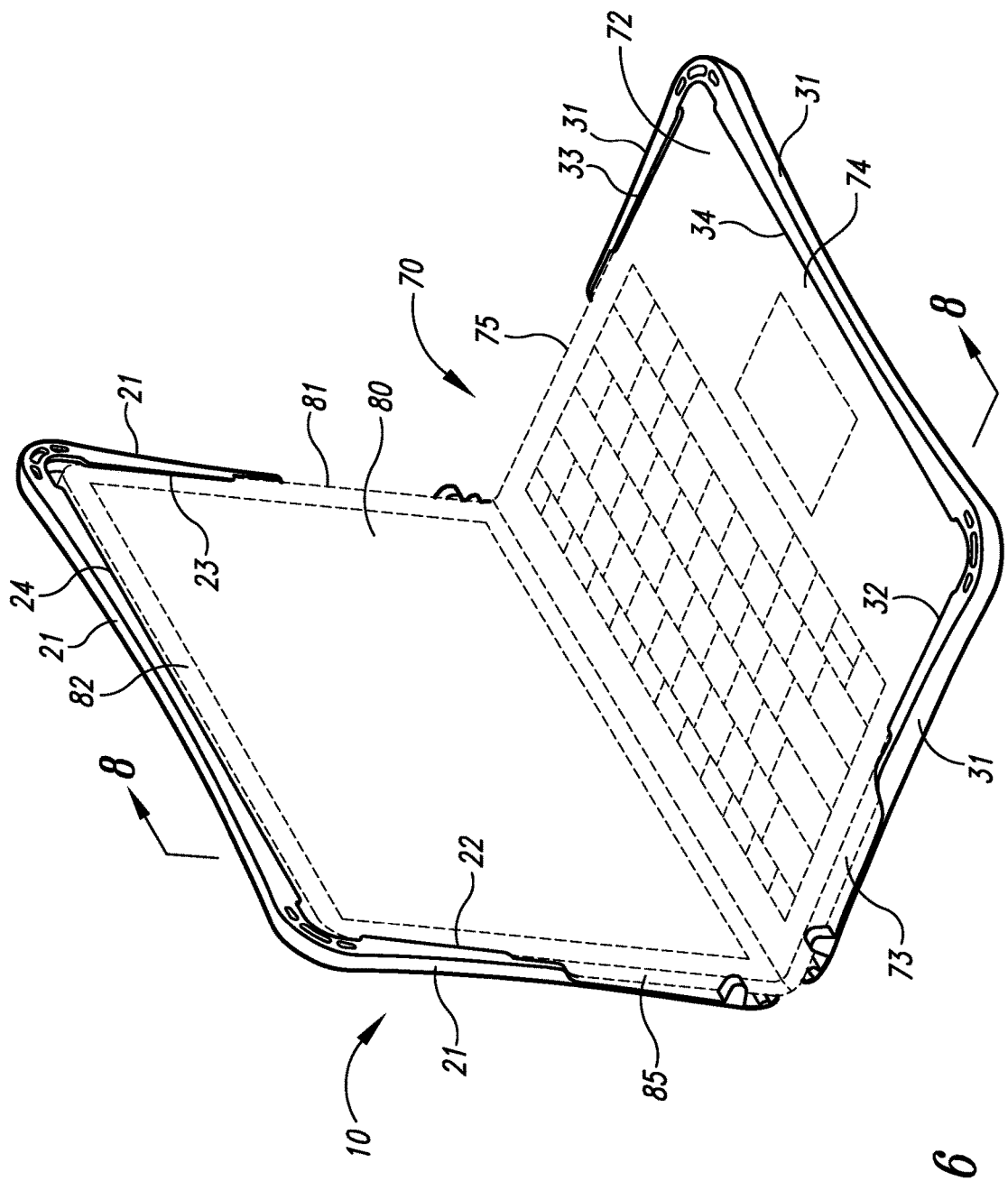
FIG. 6 is an interior perspective view of the conformable laptop case in an angled-open disposition shown engaging both the display portion and the keyboard portion of an exemplary laptop case.
Figure 7:
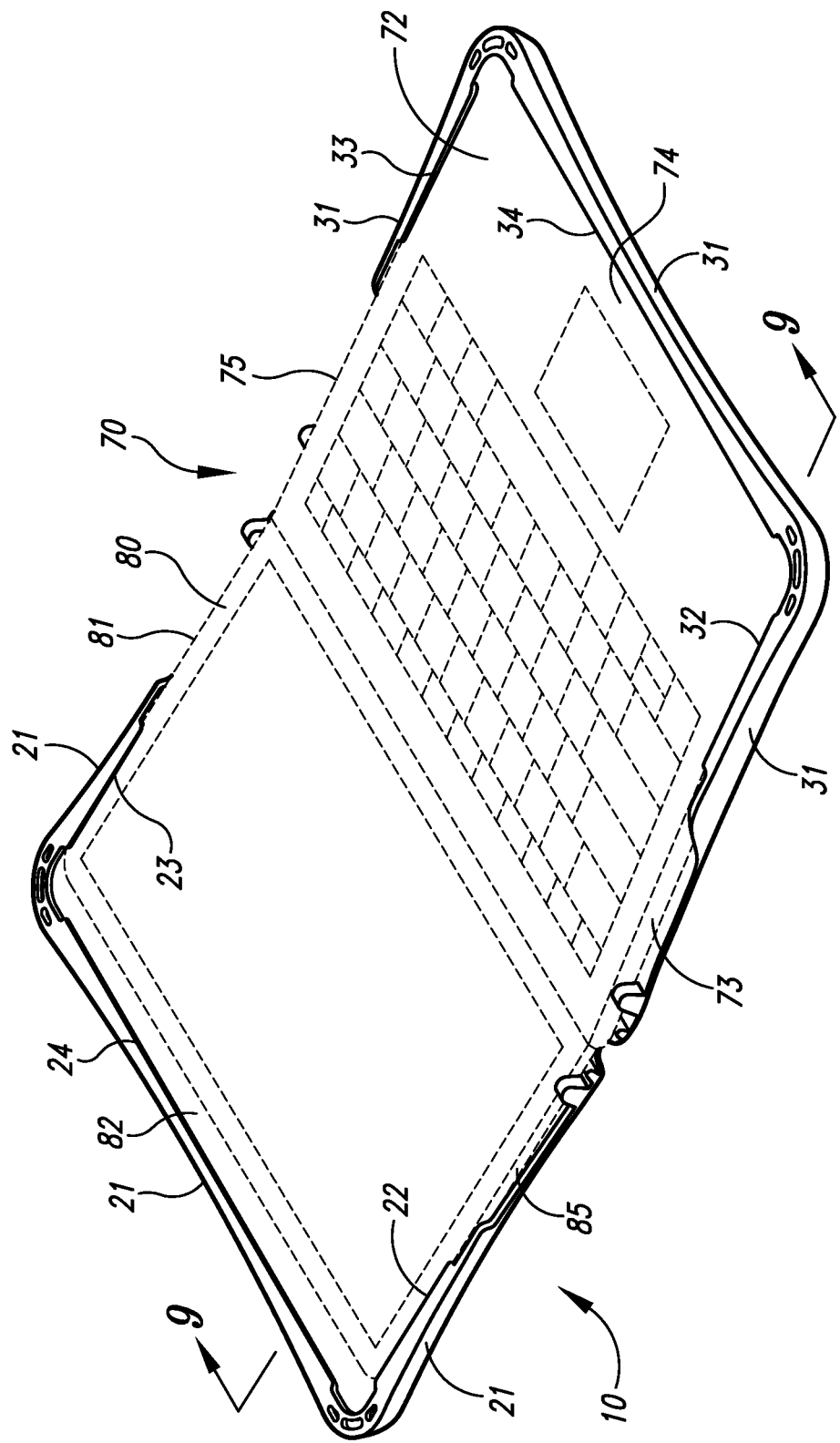
FIG. 7 is an interior perspective view of the conformable laptop case in a near-flat-open disposition shown engaging both the display portion and the keyboard portion of an exemplary laptop case.
Figure 8:
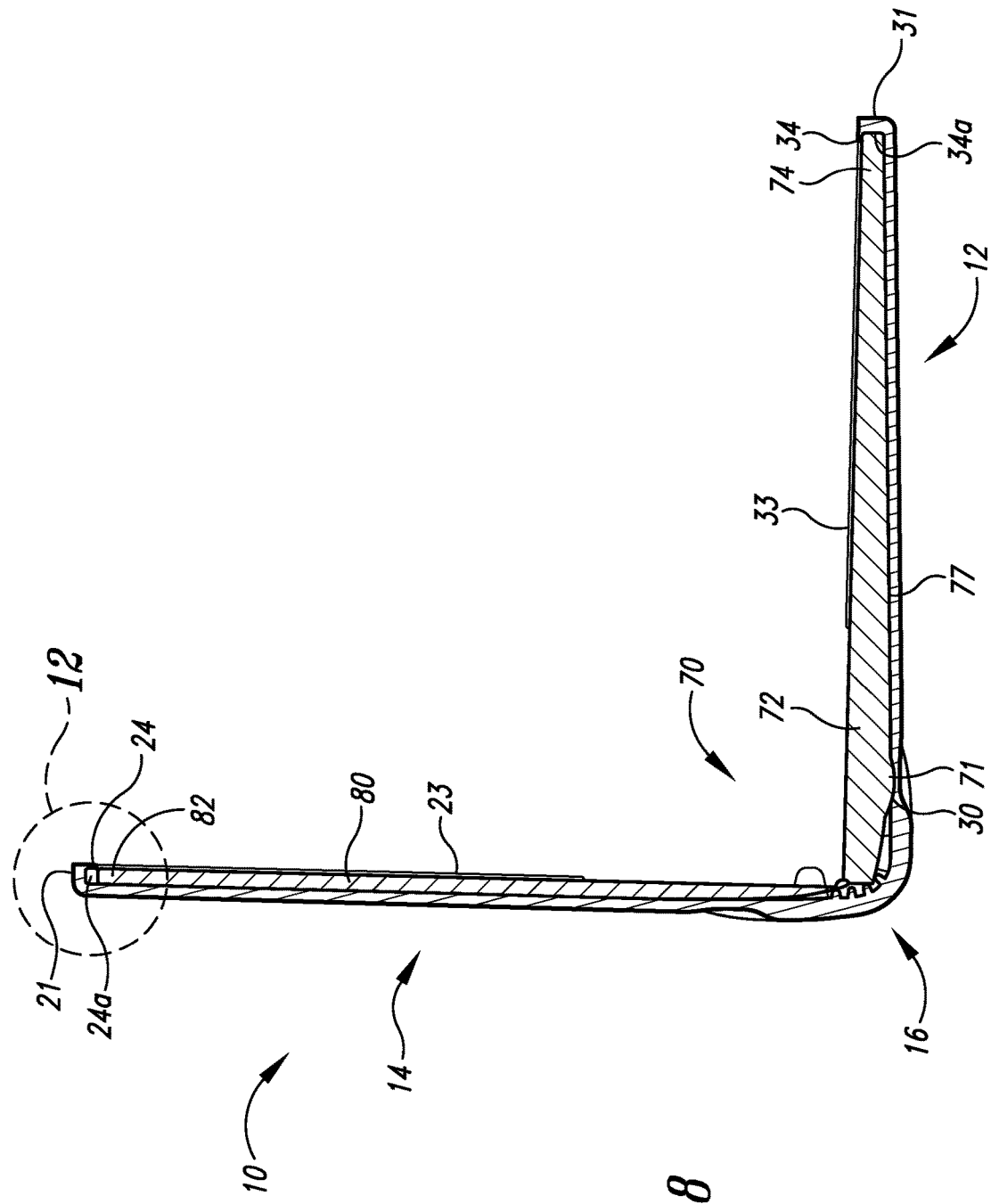
FIG. 8 is a cross-sectional view of the conformable laptop case in an angled-open disposition shown engaging both the display portion and the keyboard portion of an exemplary laptop case.
Figure 13:
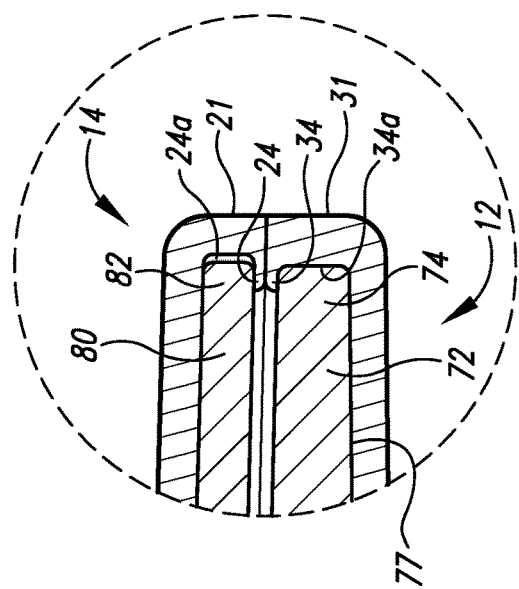
FIG. 13 is an enlarged portion of the cross-sectional view of the conformable laptop case in the closed disposition shown engaging both the display portion and the keyboard portion of an exemplary laptop case of FIG. 10 showing engagement of laptop screen portion with the conformable laptop case.
Figure 12:
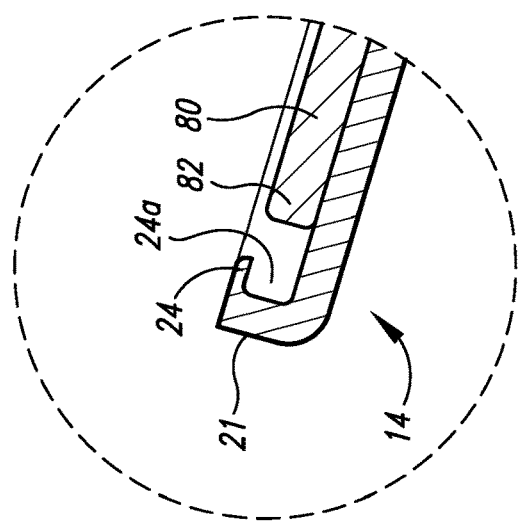
FIG. 12 is an enlarged portion of the cross-sectional view of the conformable laptop case in a near-flat-open disposition shown engaging the display portion of an exemplary laptop case of FIG. 9 showing engagement of laptop screen portion with the conformable laptop case.
Figure 11:
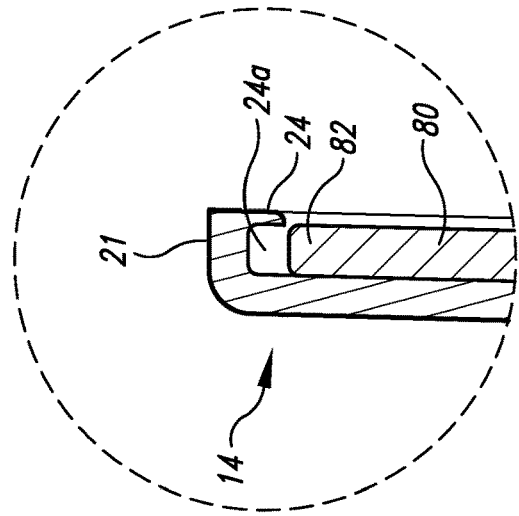
FIG. 11 is an enlarged portion of the cross-sectional view of the conformably laptop case in the angled-open disposition shown engaging the display portion of an exemplary laptop case of FIG. 8 showing engagement of laptop screen portion with the conformable laptop case.

Referring now to FIG. 6, keyboard assembly 72 can then be slid toward center flap 34 into gap 34*a* for keyboard front portion 74 to engage with center flap 34 and base portion 14*a*, at which point feet 71 (not shown) of exemplary laptop 70 are consequently seated in each respective indents 30 (not shown) of base portion 12*a*, which substantially prevents keyboard assembly 72 from sliding within gaps 32*a*, 33*a*, and 34*a* as is shown in FIG. 6. With feet 71 seated in indents 30, as portable device case 10 is opened more from position shown in FIG. 6 (shown in cross-section in FIGS. 8 and 11) to position shown in FIG. 7 (shown in cross-section in FIGS. 9 and 12), keyboard assembly 72 will remain in same position relative to base portion 14*a* (due to feet 71 fixedly engaging indents 30) while display assembly 80 will slide within gaps 22*a*, 23*a*, and 24*a*.

Referring now to FIG. 10, a cross-sectional view of portable device case 10 in closed position such that display front portion 82 is positioned in gap 24*a* nearest to guard wall 21.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device case comprising:
a keyboard case portion including a first base portion having a periphery including a first side, a second side, and a third side, the first side and the third side being substantially parallel with each other, the first side and second side being substantially perpendicular to each other;
a first wall portion extending substantially perpendicular from the first base portion along the first side of the first base portion;
a first flap of a semirigid material having an unflexed state of the first flap and a flexed state of the first flap, the first flap in the unflexed state extending from the first wall portion a first length along a first dimension perpendicular to the first wall portion outwardly over the first base portion so positioned with a first gap between the first base portion and the first flap, the first flap in the flexed state extending from the first wall portion a second length along the first dimension wherein the second length is less than the first length; and
a display case portion hingedly coupled to the keyboard case portion, the display case portion including a second base portion and one or more second flaps so positioned with one or more second gaps between the second base portion and the one or more second flaps.

2. The portable electronic device case of claim 1 wherein the one or more second flaps are semi-rigid material.

3. The portable electronic device case of claim 2 wherein the semi-rigid material is thermoplastic material.

4. The portable electronic device case of claim 1 wherein the first base portion includes one or more indents.

5. The portable electronic device case of claim 4 wherein the one or more indents are sized and shaped to receive one or more feet of a laptop.

6. The portable electronic device case of claim 1 wherein the first gap is sized to receive one or more portions of a laptop keyboard assembly.

7. The portable electronic device case of claim 1 wherein the first gap is sized to slidably engage one or more portions of a laptop keyboard assembly.

8. The portable electronic device case of claim 1 wherein the one or more second gaps are sized to receive one or more portions of a laptop display assembly.

9. The portable electronic device case of claim 1 wherein the one or more second gaps are sized to slidably engage one or more portions of a laptop display assembly.

10. The portable electronic device case of claim 1 wherein the keyboard case portion further comprising a third wall portion extending from the third side of the first base portion periphery, and a third flap extending from the third wall portion, the third flap of semi-rigid material having an unflexed state and a flexed state.

11. The portable electronic device case of claim 1 wherein the second base portion has a periphery and wherein the display case portion further comprising one or more second wall portions extending from one or more portions of the second base portion periphery, the one or more second flaps extending from the one or more second wall portions to form the one or more second gaps between the one or more second flaps and the second base portion.

* * * * *